W. C. EVANS & E. H. TAYLOR.
JACK FOR BOOT AND SHOE MACHINERY.
APPLICATION FILED MAR. 29, 1905.
936,242.
Patented Oct. 5, 1909.
2 SHEETS—SHEET 1.
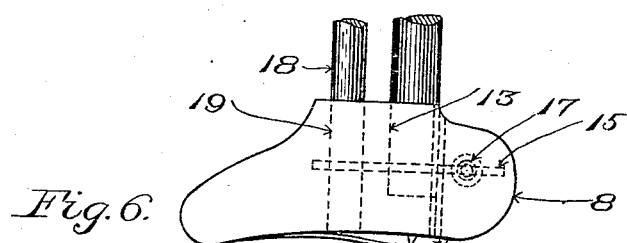
Fig. 6.
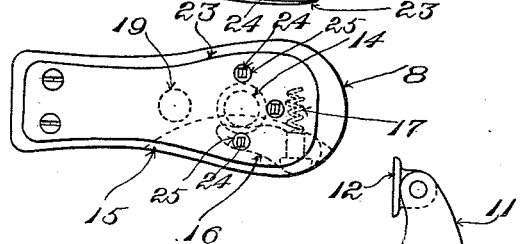
Fig. 7.
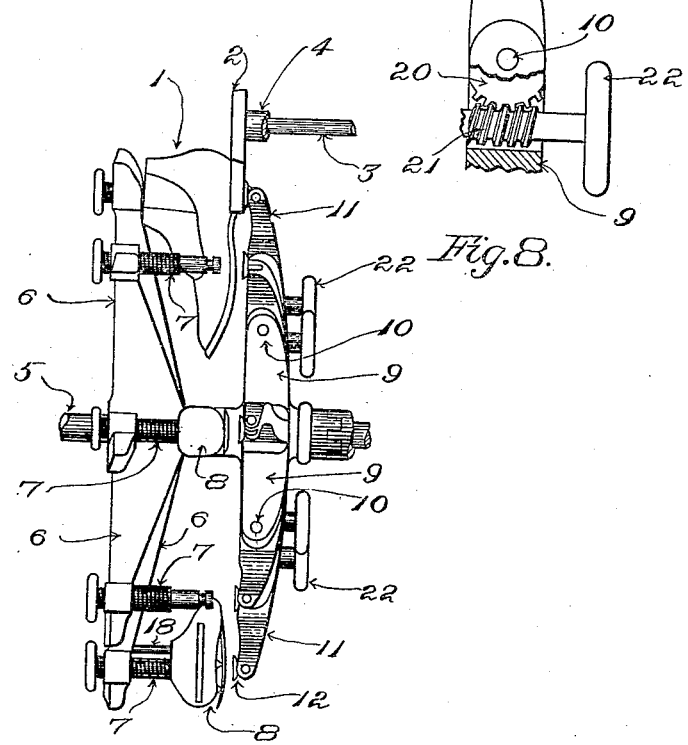
Fig. 8.
Fig. 1.
Witnesses.
Oscar F. Hill
Edith J. Anderson.
Inventors.
Warren C. Evans
Eugene H. Taylor
by Chas. F. Randall
Attorney.

W. C. EVANS & E. H. TAYLOR.
JACK FOR BOOT AND SHOE MACHINERY.
APPLICATION FILED MAR. 29, 1905.

936,242.

Patented Oct. 5, 1909.
2 SHEETS—SHEET 2.

Witnesses:
Oscar F. Hill
Edith J. Anderson.

Inventors.
Warren C. Evans
Eugene H. Taylor
by Chas. F. Randall
Attorney.

UNITED STATES PATENT OFFICE.

WARREN C. EVANS, OF EXETER, NEW HAMPSHIRE, AND EUGENE H. TAYLOR, OF LYNN, MASSACHUSETTS, ASSIGNORS TO THE AUTOMATIC HEEL TRIMMING AND BURNISHING MACHINE COMPANY, OF EXETER, NEW HAMPSHIRE, A CORPORATION OF MAINE.

JACK FOR BOOT AND SHOE MACHINERY.

936,242.

Specification of Letters Patent.

Patented Oct. 5, 1909.

Application filed March 29, 1905. Serial No. 252,617.

*To all whom it may concern:*

Be it known that we, WARREN C. EVANS and EUGENE H. TAYLOR, citizens of the United States, residing at Exeter, in the county of Rockingham, State of New Hampshire, and at Lynn, in the county of Essex and State of Massachusetts, have invented a certain new and useful Improvement in Jacks for Boot and Shoe Machinery, of which the following is a specification, reference being had therein to the accompanying drawings.

Our invention has been designed, more especially, for use in connection with machines for trimming and otherwise finishing the heels of boots and shoes after they have been attached to the latter, but some of the features of the invention are adapted to be employed in connection with machinery for the performance of various other operations in the manufacture of boots and shoes.

We have illustrated a convenient embodiment of our invention in the accompanying drawings, in which latter,—

Figure 2:
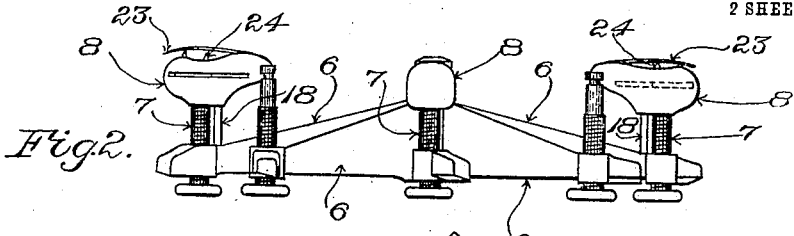
Figure 3:
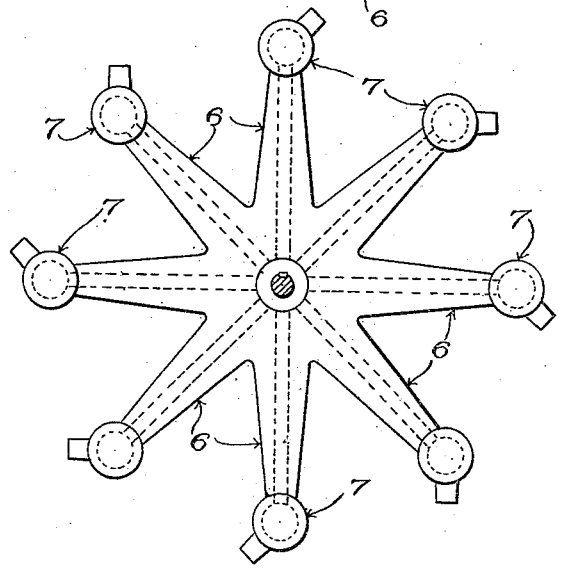
Figure 5:
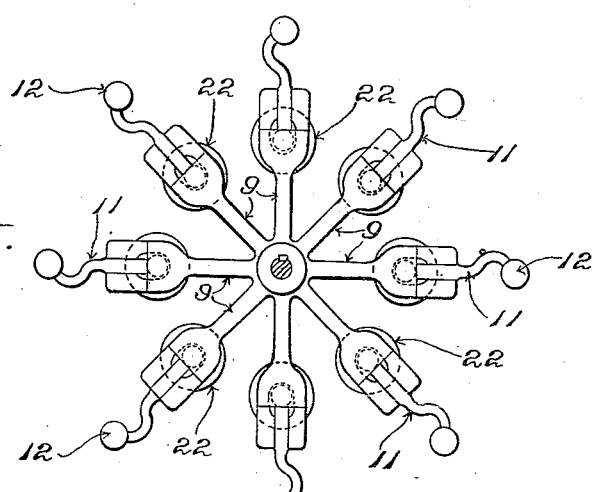
Figure 4:
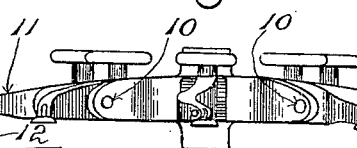

Figure 1 shows in side-elevation a work-carrier provided with a plurality of jacks constructed in conformity with the invention. Fig. 2, Sheet 2, shows in plan one of the circular series of arms comprising a portion of the work-carrier of Fig. 1. Fig. 3, Sheet 2, shows said circular series of arms in side elevation, looking from the left hand side in Fig. 1, the supporting shaft being shown in cross-section. Fig. 4, Sheet 2, shows in plan the second circular series of arms forming portions of the work-carrier. Fig. 5, Sheet 2, shows in side elevation the series of arms of Fig. 4, looking from the right hand side in Fig. 1, the supporting shaft being shown in cross-section. Fig. 6, Sheet 1, shows in elevation one of the lasts or forms constituting the work-supports which enter into the interiors of the boots or shoes that are applied to the jacks, and certain of the connected parts. Fig. 7, Sheet 1, shows the last or form of Fig. 6, looking from below in the latter figure. Fig. 8, Sheet 1, is a detail view of one of the adjustable clamping arms and its worm and worm-segment.

We have shown our invention embodied in connection with a work-carrier comprising a plurality of jacks arranged in a circular series, and adapted to be rotated step by step to present a boot or shoe which is mounted upon a given jack to the action of a suitable tool, or to the action of two or more tools in succession.

In connection with the representation of the complete work-carrier in Fig. 1 of the drawings, only one shoe, 1, is shown, for the sake of clearness, it being represented as supported in position to place its heel under the action of the rotating tool 2, the latter being carried by the shaft 3, which is supported in the bearing 4. The rotary work-carrier with its plurality of jacks is mounted upon a shaft 5, the latter having in practice suitable bearings (not necessary to be shown) on the frame of the machine in which the work-carrier is employed, the said shaft being adapted to rotate in the said bearings. The number of jacks with which the work-carrier is furnished may vary in practice. The work-carrier is constructed with two radiating series of arms. One of these series is represented in Figs. 2 and 3, Sheet 2; the other, in Figs. 4 and 5, same sheet. One arm of each series coöperates with the corresponding arm of the other series in the support of a boot or shoe, and hence such a pair of arms with their appurtenances constitute a jack. The arms 6, 6, of one set, see Figs. 1, 2 and 3, have screw-threaded holes formed through their outer extremities and receive therein hand-screws 7, 7, each carrying at its inner end a work-support 8 in the shape of a form or last. The said hand-screws constitute supports on the arms 6, 6, for the work-supports 8, 8. The arms 9, 9, of the other series, see Figs. 1, 4 and 5 have pivoted thereto, as at 10, 10, clamping arms 11, 11, to the outer extremities of which in turn plates or blocks 12, 12, are swiveled or hinged, the said plates or blocks constituting clamping members adapted to make contact with the exteriors of the boots or shoes which are applied to the work-supports 8, 8, to clamp the boots or shoes against the said work-supports, being intended in the present instance to bear against the exposed wear-faces of the heels of the boots or shoes that are mounted upon the lasts or forms which are carried by the hand-screws 7, 7, of the other series of arms. The inner extremity of each hand-screw 7 has the corresponding last or form 8 removably connected therewith in suitable manner to prevent accidental disengagement of the last or form from the hand-screw. The manner of connecting the two together so as to permit convenient removal and replacement, and the means of preventing undesired disengagement of the last or form from the hand-screw may be varied in practice.

In Figs. 6 and 7, Sheet 1, we have shown the end of the hand-screw entered into a socket 13 in the last or form 8. The said end is formed with a circumferential groove 14, Fig. 7, Sheet 1, and the last or form has a transverse slot 15, Figs. 6 and 7, within which is fitted a latching lever 16, one extremity of which is acted upon by a spring 17 conveniently contained within a cavity in the last or form, while the other extremity thereof enters the circumferential groove 14 of the hand-screw. Means is provided for retaining the last or form in a predetermined position upon the work-carrier, usually radial, while permitting the same to be adjusted transversely with relation to the tools. This result may be variously secured in practice. In the present instance, a pin 18, is attached to each arm 6, the said pin extending parallel with the hand-screw 7 and being received within a hole 19 that is formed within the body of the last or form parallel with the socket for the hand-screw. The said pin holds the last or form from turning relatively to the work-carrier, but the last or form is left free to be adjusted as desired in the direction of the length of the hand-screw by means of the hand-screw.

The pivoted clamping arms 11, 11, are furnished with worm-gear segments 20, 20, that are engaged by worms 21, 21, the said worms being mounted to turn in bearings in the fixed arms, and being provided with hand-wheels 22, 22, for convenience of manipulation. By means of these worms and their hand-wheels the pivoted clamping arms 11, 11, may be operated to cause their swiveled plates or blocks 12, 12, to bear against the faces of the top-lifts of the heels which are opposite the same, or to withdraw said swiveled plates or blocks from contact with the said top-lifts. The use of the worms and worm-wheels for adjusting the pivoted arms and their clamping plates or blocks is preferable to the use of pawl and ratchet devices for the same purpose. Pawls are liable to become disengaged from their ratchets by the jar of the machine, and they do not permit a sufficiently accurate adjustment of the parts to enable the heel-seat of a shoe to be adjusted with precision relative to the tool. The worms and worm-wheels, on the other hand, hold the pivoted arms securely locked in the position which is given to the latter. They are not subject to such rapid wear as in the case of the ratchets, and consequently are less liable to get out of order. They permit, moreover, a delicate and exact positioning of the heel-seat of a boot or shoe relative to the cutter and other tools which are intended to act upon the heel. It is important to effect adjustment to a nicety of the heel-seat of a boot or shoe which has been applied to a work-carrier or jack, relative to the working tools, so that possibility of injury to the upper of a shoe by any of the tools shall be precluded, while the heel itself shall be perfectly and completely operated upon from the heel-seat to the bottom or outer face of the top-lift.

The thickness and compressibility of the uppers of boots and shoes, of the inner soles thereof, and of the counter-stiffeners, vary quite considerably in practice, and inasmuch as the combined thickness, after compression between the last or form 8 and the opposing plate or block 12, of upper, inner sole, and counter stiffener flanges, intervening between the bottom of the last or form and the heel-seat of a boot or shoe, determines the distance of the said heel-seat from the said bottom of the last or form, it is evident that as the said combined thickness varies the said distance will also vary. Consequently, in a heel-finishing machine the position of the heel-seat of a boot or shoe, mounted on one of the lasts or forms, relative to a tool to which the boot or shoe is presented for action, would vary in different boots or shoes according as such combined thickness varies, if adjustment were not made in order to compensate therefor. This would result in some cases, if the said combined thickness should be sufficiently great, in bringing the upper of the boot or shoe adjacent the heel-seat within the range of action of the tool to which it is presented, with resulting injury to the upper. If the thickness were too slight, the upper portion of the heel at the heel-seat in some cases would not be presented within the range of action of the tool, and consequently the heel would not be completely finished; in others, injury to the heel would result from the action of a tool thereon at one side of the heel-seat.

The variations which have just been referred to in the case of successive boots or shoes may be compensated for by the operator, if desired, by making adjustment of the hand-screws 7, 7, and thereby adjusting the respective work-supports 8, 8, transversely relative to the tool. In this connection, however, we have aimed to render it possible to make one adjustment of the hand-screws 7, 7, before beginning work upon a given line of shoes, and thereafter leave them undisturbed in their adjustment, and to effect the required positioning of the boots or shoes transversely with relation to the respective tools in jacking the boots or shoes by moving the clamping arms 11, 11, through the agency of the worms 21, 21, and worm-gear segments 20, 20. This has the advantages of rendering it unnecessary to use both hands in effecting the required adjustments during jacking, and expedites the performance of the jacking operations. To this end, each last or form is made yielding in a direction transverse with reference to the finishing tool. The capacity for yielding may be secured in a variety of ways. Herein we have applied to the bottom of each last or form 8 a yielding bearing portion intended to make contact with the surface of the inner sole of a boot or shoe that is applied to the last or form. As the clamping block or plate on the pivoted arm of the jack is caused by the adjustment of the said arm to press against the exposed face of the top-lift of the heel of the boot or shoe, by the turning of the corresponding worm 21 by the operator, the said yielding bearing gives way under the pressure. In this way the boot or shoe may be forced transversely until the heel-seat thereof is seen to be in proper position relatively to the tools. Herein, the said yielding bearing is constituted by a bent plate or strip 23 of spring material which is secured by one end thereof to the bottom of the last at or near the toe-end of the latter, the other end of the plate or strip being free and being sprung away from the bottom of the last to the required distance to provide for the desired amount of play and adjustment.

For the purpose of holding the boot or shoe which is mounted on the last or form firmly against turning upon the latter while being acted upon by the tools, the last or form is furnished with spurs or points 24, 24, projecting from the bottom thereof for engagement with the inner sole of the boot or shoe. In the present embodiment of the invention, the said spurs or points are arranged in position to pass through holes 25, 25, Fig. 7, that are made for the purpose in the spring-strip or plate 23. In the normal outsprung position of the said strip or plate, the latter stands beyond the ends of said spurs or points, and covers or shields the latter, so as to enable a boot or shoe to be slipped onto the last or form without engagement of the spurs or points with the material of the boot or shoe, as, for instance, with the surface of the inner sole, which would result in injury thereto. When the pivoted arm and its block or plate are adjusted by the operator to clamp the boot or shoe firmly to the last or form, the spurs or points are exposed through the holes in the spring-strip or plate as the latter is compressed, and enter into the inner sole as the latter is forced on to the said spurs or points. When the pressure of the said block or plate against the face of the heel is relieved, the strip or plate springs away from the bottom of the last or form again, once more covering or shielding the spurs or points, so that the latter shall be prevented from interfering with the removal of the boot or shoe, and from occasioning injury to the latter.

What we claim is:—

1. A rotatable work-carrier provided with a radial arm, a form or last provided with a yielding bearing which constitutes a portion thereof and mounted on the said arm, a clamping member opposite the said form or last, and means to move the said clamping member toward the form or last to first clamp the boot or shoe to the latter and then adjust the said boot or shoe laterally, through the yielding of the said bearing of the form or last, into the desired position for being acted upon by the operating tool.

2. In a heel-finishing machine, in combination, a finishing tool, a work-support adapted to enter the boot or shoe to be operated upon and having spurs or points to engage with the inner sole of a boot or shoe mounted thereon, the said work support also having a yielding bearing portion to make contact with the inner sole of the said boot or shoe and constituting a shield for the said spurs or points adapted to be moved to expose the latter by pressure of the shoe thereagainst; a movable clamping member adapted to make contact with the exterior of the boot or shoe to clamp the boot or shoe against the said yielding bearing portion and upon the said spurs or points and also adjust it into the desired position relative to the tool.

3. In a heel-finishing machine, in combination, a finishing tool, a work-carrier provided with a work-support adapted to enter into the interior of a boot or shoe and arranged to yield transversely with relation to said tool under pressure applied by the movable clamping member, spurs or points normally concealed or shielded but exposed by the said yielding to engage with the inner sole of the boot or shoe mounted on the work-support, the said movable clamping member, and means to adjust the latter whereby to clamp the boot or shoe in place on the work-support and adjust the boot or shoe into the required position relative to the tool.

4. In a heel-finishing machine, in combination, a finishing tool, a work-carrier provided with a work-support adapted to enter into the interior of a boot or shoe and having a yielding bearing portion to make contact with the inner sole of a boot or shoe applied to said work-support, and also having spurs or points which are concealed when said bearing portion is in its normal position and by inward movement of said portion are caused to engage with said inner sole, a movable clamping member, and means to operate said movable clamping member to clamp the shoe against the said work-support and also adjust the boot or shoe relative to the tool.

5. In a heel-finishing machine, in combination, a finishing tool, a supporting arm, a longitudinally-adjustable support applied to the said arm, a work-support connected with the said support and having a yielding bearing portion, spurs or points sheathed or protected by said bearing portion in the normal position of the latter and exposed for action when said portion is forced inward, a movable clamping member, and means to adjust said clamping member to clamp a boot or shoe on said work-support against said bearing portion and cause said spurs or points to enter the inner sole of said boot or shoe, whereby the latter is held from turning on the work-support, and also adjust the boot or shoe into the desired position relative to the tool.

6. The improved work-carrier provided with an arm, a hand-screw extending laterally with respect to the said arm, a last or work-support detachably applied to the said support and adapted to enter into the interior of a boot or shoe, a steady-pin to hold the last or work-support from turning upon the screw a latch to hold the last or work-support upon the said hand-screw, and a movable clamping member acting against the exterior surface of the boot or shoe.

In testimony whereof we affix our signatures, in presence of two witnesses.

WARREN C. EVANS.
EUGENE H. TAYLOR.

Witnesses to signature of Warren C. Evans:
CHARLES E. BYINGTON,
DANIEL GILMAN.

Witnesses to signature of Eugene H. Taylor:
DANIEL GILMAN,
CHAS. F. RANDALL.